US009110151B2

(12) United States Patent
Rakanovic et al.

(10) Patent No.: US 9,110,151 B2
(45) Date of Patent: Aug. 18, 2015

(54) METHOD AND DEVICE FOR IMPROVING THE LOCALIZATION AND MOBILITY CONTROL OF PERSONS OR THINGS

(75) Inventors: Demir Rakanovic, Muggia (IT); Amela Rakanovic, Sezana (SI)

(73) Assignee: NEONSEVEN SPA, Sgonico (IT)

( * ) Notice: Subject to any disclaimer, the term of this patent is extended or adjusted under 35 U.S.C. 154(b) by 385 days.

(21) Appl. No.: 12/819,423

(22) Filed: Jun. 21, 2010

(65) Prior Publication Data

US 2010/0311440 A1 Dec. 9, 2010

Related U.S. Application Data

(63) Continuation-in-part of application No. PCT/IT2007/000906, filed on Dec. 21, 2007.

(51) Int. Cl.
| | |
|---|---|
| *H04W 24/00* | (2009.01) |
| *G01S 5/10* | (2006.01) |
| *G01S 5/06* | (2006.01) |
| *G01S 5/14* | (2006.01) |
| *H04W 64/00* | (2009.01) |
| *H04W 8/18* | (2009.01) |

(52) U.S. Cl.
CPC ... *G01S 5/10* (2013.01); *G01S 5/06* (2013.01); *G01S 5/14* (2013.01); *H04W 64/00* (2013.01); *H04W 8/183* (2013.01)

(58) Field of Classification Search
CPC ....... H04W 4/22; H04W 36/14; H04W 36/32; H04W 36/36; H04W 64/00; H04W 88/06; H04W 92/10
USPC ..................... 455/404.1–404.2, 414.1–414.4, 455/456.1–457; 340/539.1–539.32
See application file for complete search history.

(56) References Cited

U.S. PATENT DOCUMENTS

| | | | |
|---|---|---|---|
| 6,201,803 B1 * | 3/2001 | Munday et al. ............... 370/350 |
| 2001/0002822 A1 * | 6/2001 | Watters et al. ............. 342/357.1 |
| 2004/0072581 A1 * | 4/2004 | Tajima et al. .............. 455/456.1 |
| 2004/0242234 A1 * | 12/2004 | Klenner ........................ 455/446 |
| 2006/0009235 A1 * | 1/2006 | Sheynblat et al. .......... 455/456.1 |

FOREIGN PATENT DOCUMENTS

WO 96/35306 A 11/1996

* cited by examiner

*Primary Examiner* — Vladimir Magloire
*Assistant Examiner* — Erica Navar
(74) *Attorney, Agent, or Firm* — Lucas & Mercanti, LLP

(57) ABSTRACT

A method for improving the localization and mobility control of persons or things applicable to a mobile radio terminal associated with a telephone network, having a plurality of base radio stations is disclosed. The method includes a first step in which the mobile radio terminal receives first service signals associated with each base radio station within radio visibility, a second step in which, by means of processing means, the mobile radio terminal detects the relative temporal delays, calculated with respect to a predetermined time reference, with which are received the service signals of each base radio station from which the mobile radio terminal received a corresponding first service signal, and in which second step, by means of position detection means, associated with the mobile radio terminal, the absolute geographical position occupied by the mobile radio terminal is supplied to the mobile radio terminal. In the second step, by means of the processing means, the mobile radio terminal calculates the absolute geographical position of each of the base radio stations, from which the mobile radio terminal has received a first service signal, according to the relative temporal delays, wherein the relative temporal delays are correlated with the absolute geographical position of the mobile radio terminal as supplied by the position detection means.

9 Claims, 5 Drawing Sheets

METHOD AND DEVICE FOR IMPROVING THE LOCALIZATION AND MOBILITY CONTROL OF PERSONS OR THINGS

CROSS-REFERENCE TO RELATED APPLICATIONS

This application is a continuation-in-part (CIP) of PCT International Application Serial No. PCT/IT2007/000906 filed Dec. 21, 2007, the contents of which are incorporated herein by reference.

FIELD OF THE INVENTION

The present invention concerns a method for improving the localization and mobility control, and the device that implements it, used to identify the position of persons or things in a pre-defined geographical context served by a mobile cellular telephone network.

In particular the present invention is applicable to mobile communication terminals such as cell phones and radio modems based on different technologies such as GSM, 2G, UMTS, 3G and the like, to support surfing and personal mobility services, remote monitoring and/or range-finding, positioning alarms and/or remote control, as an auxiliary for public transport and other similar applications.

BACKGROUND OF THE INVENTION

The development of the radio-mobile telecommunications market and the ever more wide-spread use of personal communication devices and communication between machines, known as M2M (Machine-to-Machine), make the supply of services for mobility control more and more economical. Furthermore, the introduction of packet transmission services such as those provided by the radio-mobile network of the GSM (2G), UMTS(3G) and the like, by ensuring constant connectivity to the communication network, at the same time makes the localization services more and more efficient and accessible.

A first known category of localization and mobility control methods consists of "network based" methods. These methods provide to process measurements made on predetermined physical values of the radio electric signal, detected by a mobile radio terminal and by the mobile telephone network. E-OTD (Enhanced Observed Time Difference), TDOA (Time Difference of Arrival), AFLT (Advanced Forward Link Trilateration) and Cell-ID all belong to this category.

All methods of the first known category require an active support by the network that shall be involved to provide broadcasted information on the network geographical structure or to provide positioning estimation services based on mobile station performed measurements.

In particular, E-OTD, TDOA Downlink and AFLT are based on the accurate measurement of the delay in propagation of a specific signal transmitted by a constellation of base radio stations, also known as cells, of known geographical position, and received by the mobile radio terminal, the position of which is calculated by triangulation.

TDOA uplink is also based on a triangulation calculation: in this case the measurement is made on the delay with which the signal transmitted by the mobile radio terminal is received by at least three base radio stations.

Cell-ID, on the contrary, is based on a parameter of the mobile radio network transmitted by each base radio station in order to allow the univocal identification of a determinate geographical area. In this case the geographical localization is indicative of the area covered by the base radio station.

An example of "network based" method is described in WO 96/35306 in which a mobile unit, namely a cell phone, calculates its own geographical position, on the basis of the measurements of time differences of predetermined service signals received by the mobile unit from at least four Base Transceiver Stations, or BTS, serving the mobile unit itself. In order to calculate its own geographical position, the mobile unit must also know the exact geographical position of serving BTS stations. This is carried out by sending at least a specific message, such as an SMS (Short Message Service), to mobile units, said message containing at least data related to the exact geographical position of the serving BTS stations. This message should be broadcasted at a predetermined time rate so as to allow each mobile unit to calculate its own position.

One disadvantage of network-based methods is that the localization service is carried out by the company that manages the mobile telephone network, and that it implies a rather considerable use of radio resources. For example, the impact of the localization service traffic may not be negligible compared with the normal network traffic. This requires an increase in the network resources in order to maintain the desired quality of service at predetermined levels, and a consequent increase in the costs of managing the network infrastructure. On the contrary there may also be a deterioration of the localization service, especially when the service is widely diffused and in highly urbanized areas. Furthermore, these localization methods are guaranteed in a specific national area, whereas they may not be usable abroad, since they are connected to specific services supplied by particular network operators.

There is a second category of known localization and mobility control methods called mobile-based, or satellite based, methods. These are substantially autonomous from the network in calculating position. One method is based on GNSS technology (Global Navigation Satellite System) of which GPS (Global Position System) is the most widespread.

GNSS is based on a triangulation principle which, measuring the difference in the propagation delay of a signal emitted by a constellation of satellites orbiting the Earth, and received by a generic device, calculates with great precision the geographical coordinates thereof.

One disadvantage of mobile based methods is that the cover of the unidirectional signal transmitted by the satellites is not always constant, since, while the cover of the signal is substantially guaranteed in the open, such as in the countryside or at sea, it fails in areas inside houses and in highly urbanized areas, where the presence of tall buildings makes it impossible to see the minimum number of satellites needed to calculate triangulation.

Another disadvantage is due to the high electric consumption of the GNSS receiver, which is in any case higher than the electric consumption of a mobile terminal in inactive condition. This entails a considerable decrease in the operating autonomy of the batteries.

One purpose of the present invention is to achieve an improved localization and mobility control method, applicable to a mobile radio terminal served by a mobile telephone network, which allows the absolute or relative localization of the terminal, or a person or object associated with said terminal, in an autonomous manner and without the network being aware.

Another purpose of the present invention is to achieve an improved localization and mobility control method which allows a minimum energy consumption for mobile terminals.

Another purpose is to achieve a localization and mobility control method, which allows localization in every operative condition.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a method for the localization and mobility control of persons or things according to the present invention is applicable for the localization and/or mobility control of a mobile radio terminal associated with at least a mobile phone communication network comprising a plurality of base radio stations.

Each base radio station transmits periodically, at predetermined and constant intervals, a service signal suitable to synchronize the transmissions and receptions for each mobile radio terminal disposed in its cover area.

The method according to the present invention comprises a first step in which the mobile radio terminal receives a first service signal from a predetermined set of base radio stations within radio visibility, and assumes as a time reference its own internal high-precision time reference, such as for example a hardware timer, or the service signal of a predetermined reference base radio station, for example the base radio station which serves the mobile radio terminal.

The method according to the present invention comprises a second step in which, by means of processing means, the mobile radio terminal detects the relative delay of the service signal of each base radio station from which it has received a first service signal. This detection occurs according to the delay estimated with respect to said time reference with which the first service signals of each base radio station were received.

In the second step, by means of position detection means associated with the mobile radio terminal the absolute geographical position occupied by the mobile radio terminal is detected.

According to an aspect of the present invention, in said second step the absolute geographical position is also calculated of each of said base radio stations from which the mobile radio terminal has received a corresponding first service signal. The absolute geographical positions of the base radio stations are calculated, as will be explained in detail hereafter, by calculating the delay with respect to its own time reference with which the first service signals of each base radio station were received. The delays are then correlated to the indications of absolute geographical position of the mobile radio terminal supplied by the position detection means.

According to a further aspect the method comprises a third step in which, by means of memorization means of the mobile radio terminal, the absolute geographical positions of each base radio station detected in the second step are memorized.

In this way it is possible to create and memorize in the mobile radio terminal a map of the absolute positions of a predetermined set of base radio stations from which at least one service signal has been received.

According to a further aspect the method also comprises a fourth step in which a new geographical position occupied by the mobile radio terminal is calculated by means of said processing means, both according to the map of the base radio stations memorized in the memorization means and also according to the temporal delays with which the service signals of each base radio station of the predetermined set of base radio stations are received by the mobile radio terminal, with respect to the time reference of the mobile radio terminal itself.

One advantage of this method is that, with the initial aid of a precision localization device such as for example a GNSS receiver, it allows a mobile radio terminal to maintain the knowledge of its own position in a predetermined geographical context served by the mobile radio network even in the absence of further indications by the precision localization device. Therefore, the method according to the invention allows the localization of its own position, in an autonomous manner and without the mobile telephone network being aware, such as in the localization methods of the state of the art, even in those situations in which the precision mobile-based localization means, that is the GNSS receiver, is not able to operate correctly, such as for example in darkened areas, highly urbanized areas or in the presence of tall buildings. Indeed, to this end the service signals needed to manage the access to the mobile telephone network and to maintain the connection between the mobile radio terminal and the phone communication network itself are used.

Another advantage of this method is that it is independent from the operators who manage the mobile radio telephone service, and therefore allows to control mobility and/or localization irrespective of the particular geographical context, for example national or abroad, wherever the mobile radio terminal may be found.

A further advantage is that it has no impact on the normal running costs of the mobile radio terminal, since the method according to the invention does not provided the transmission and reception of data that is subject to pricing by the mobile telephone network companies.

A further advantage of this method is that it is possible to effect the localization of the mobile radio terminal without using, except for an initial geographical localization of the base radio stations, precision localization means, the electric consumption of which is comparable with the electric consumption of the mobile radio terminal. Indeed, the precision localization means may be disabled or switched off, and the mobile radio system calculates its own geographical localization using normal signals service signals received from the base stations of the mobile phone network. In this way it is possible to considerably reduce the electric consumption of the mobile radio terminal, at the same time providing an advanced service and increasing the operating autonomy of the feed means of the mobile radio terminal, which are typically batteries.

BRIEF DESCRIPTION OF THE DRAWINGS

These and other characteristics of the present invention will become apparent from the following description of some preferential forms of embodiment, given as a non-restrictive example with reference to the attached drawings wherein.

DETAILED DESCRIPTION OF A PREFERENTIAL FORM OF EMBODIMENT

Figure 1:
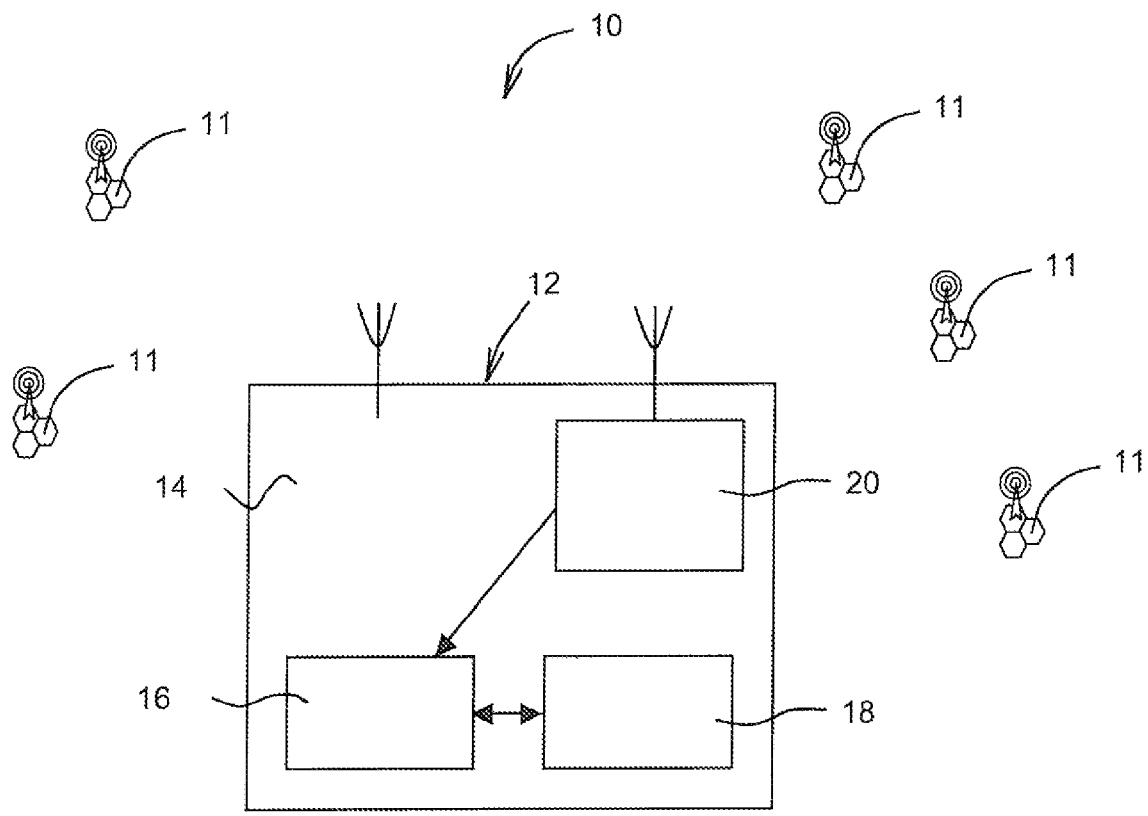
FIG. 1 is a schematic view of a device according to the present invention.
Figure 2:
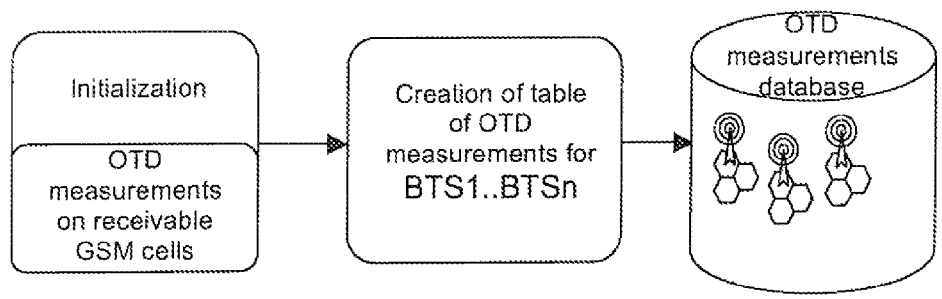
FIG. 2 is a flow chart showing some steps of the method according to the present invention.

With reference to the attached drawings, a method for improving the localization and mobility control of persons or things according to the present invention can be used to identify the position of a mobile radio terminal for voice and data telecommunications connected to a cellular telephone network 10 of a known type. The telephone network 10 (FIG. 1) comprises a plurality of fixed Base Transceiver Stations 11 (BTS), each suitable for the radio cover of a predetermined geographical area in order to supply a voice and data telephone service. It is understood that by cellular telephone network 10 we mean a cellular communication network comprising all the mobile telephone networks of different companies providing mobile phone services.

In this case the mobile radio terminal is a GSM phone 12, but it is understood that the method is also applicable for mobile radio terminals with access protocols to cellular telephone networks 10 of GPRS/EDGE, UMTS or similar types.

Access by a GSM, phone 12 to the radio resources of a predetermined BTS 11 occurs in FD-TDMA mode (Frequency Division-Time Division Multiple Access). In this method, a set of radiofrequency carriers, emitted by each BTS 11 on different frequencies and with a predetermined bandwidth, is suitable for division into regular time intervals, or slots, according to which the transmission of different users are multiplexed over time.

Each slot is divided into a guard interval, which compensates the time lags of the signals due to the movement of the users, and into a usable signal interval called burst. Eight slots make up a TDMA frame 34 or access frame to time multiplexing, each identified by means of a progressive number FN (Frame Number) by the BTS 11. Each TDMA frame 34 constitutes the minimum period based on which the traffic and control information, whether dedicated or common to several users, is multiplexed according to known and periodic patterns. The patterns of use of the physical channels for the transmission of coherent information are called logic channels.

In particular, each BTS 11 broadcasts a radio synchronization signal suitable to transport logic and synchronization information necessary to the GSM terminals 12 to receive and decode the setting messages transmitted by each BTS 11 on a carrier channel BCCH (Broadcast Control Channel), in order to configure and access the voice and/or data traffic channels. The signal is transmitted in radio frequency by each BTS 11 periodically and with a repetition pattern known in advance, so as to achieve a logic synchronization channel called SCH (Synchronization Channel).

Figure 4:
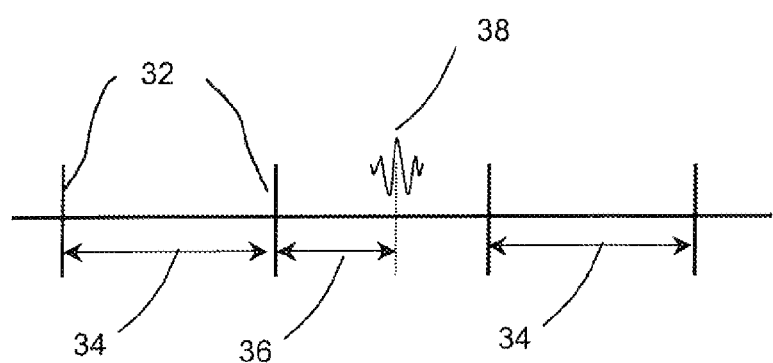
FIG. 4 is a time chart of a reference signal.

Every radio frequency transmission of the logic channel SCH (FIG. 4), defined Synchronization Burst or SB 38, comprises, encoded inside the current FN and the BSIC code (Base Station Identity Code), which together with the ARFCN value (Absolute Radio Frequency Channel) allows the univocal identification of each BTS 11 inside the mobile telephone network 10.

In order to be able to receive and decode the logic channels transmitted by the BTS 11, the GSM terminal 12 synchronizes its own internal time reference with the TDMA frame 34 structure of the signal received. As time reference 32 inside the GSM phone 12 a timer device of a known type is used, not shown in the drawings, high precision and suitable to provide a temporal measurement of the TDMA frames 34. The temporal duration of each individual TFMA frame 34 is 4.615 milliseconds. Moreover, the internal timer device, in order to perform desired time alignments and to manage the transmission and reception of the radiofrequency bursts, divides every TDMA frame 34 into 10,000 parts called Octal Bits or OB, each of 0.4615 microseconds.

Figure 3:
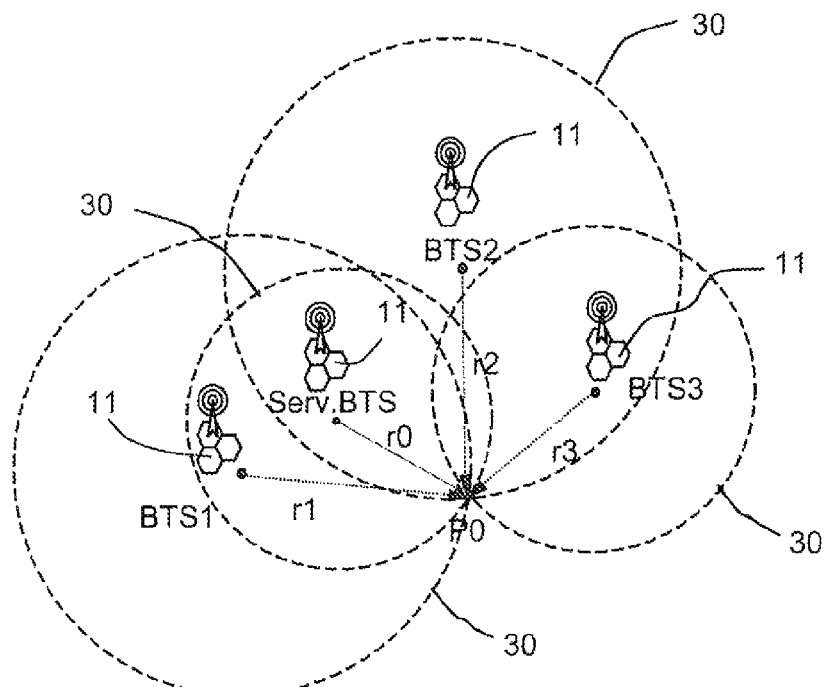
FIG. 3 is a schematic view of a step of the method according to the present invention.

The method according to the present invention comprises a first step in which the GSM phone 12 is positioned in an arbitrary geographical position P0 (FIG. 3) at a distance r0 from the server BTS 11 and at distances r1, r2 and r3 from three adjacent BTS 11, the service areas of which are able to cover the position P0. In FIG. 3 the adjacent BTS 11 are indicated as BTS1, BTS2 and BTS3. It is understood that the number of adjacent stations can be more or less with respect to the number of stations described here.

In order to connect to the telephone network 10 and/or to maintain the connection under conditions of mobility, in this first step, during the reception of the synchronization signals, the GSM phone 12 detects, in a known manner and not described in this description, some parameters as listed below.

A first parameter is the level of power of the carrier channel BCCH received by each adjacent BTS 11.

A second parameter is the Frame Number Delay or FND, that is, the relative temporal delay with which a TDMA frame 34 of a first adjacent BTS 11 is received with respect to a TDMA frame 34 of a second adjacent BTS 11 and taken as a reference BTS, for example the server BTS 11.

A third parameter is the Octal Bit Delay or OBD 36 (FIG. 4), that is, the relative delay with which an SB 38 of an adjacent BTS 11 is received with respect to the internal time reference 32 of the GSM phone 12.

Finally, a fourth parameter is the identification code Base Station Identification Code or BSIC received by each adjacent BTS 11 consisting of an alphanumerical code, in this case of the hexadecimal type.

In a second step the GSM phone 12, by means of a processing unit 16, detects the delay times, or Observed Time Differences OTD (FIG. 1 and FIG. 3) with which the synchronization signals SB are received, associated with each of the adjacent BTS 11 with respect to the synchronization signal of the server BTS 11 and identified by means of the BSIC and ARFCN codes.

In the second step, by means of a geographical position detector 20 of a known type (FIGS. 1 and 5), for example a GNSS/GPS receiver, associated with the GSM phone 12 and suitable to detect the geographical position occupied by the GSM phone 12, the absolute geographical position of the adjacent BTS 11 is calculated, in the manner described hereafter, from which BTS 11 the GSM phone 12 can receive a corresponding synchronization signal.

In particular, the absolute geographical position of a determinate BTS 11 is calculated according to the detected delays OBD of the synchronization signal SCH transmitted thereby, with respect to the internal time reference 32 of the GSM phone 12 generated according to the signal SCH of a reference BTS, for example the serving BTS 11. The delays OBD are correlated to the detections, made by means of the geographical position detector 20, in the corresponding positions occupied by the GSM phone 12 in said second step.

Figure 5:
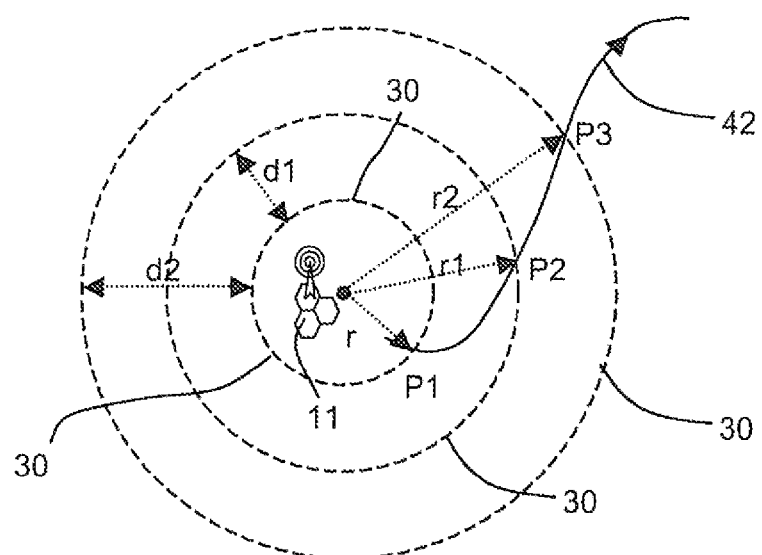
FIG. 5 is a schematic view of a step of the method t according to the present invention.

In fact, with reference to FIG. 5 we consider a GSM phone 12 in movement according to a non-rectilinear trajectory 42, passing at different moments of time through three different geographical positions P1, P2 and P3. In each of these three positions, by means of the position detector 20, detections of the geographical position are made, identifying the absolute coordinates of each position. The coordinates are advantageously referred in a reference system for example of the Cartesian type. Each position occupied by the GSM phone 12 is associated with respective coordinates P1(x1,y1), P2(x2, y2), P3(x3,y3).

Simultaneously with the detection of the geographical coordinates of the terminal by means of GNSS/GPS, in each of said three positions, detections are made of the delays OBD with which the synchronization signals SCH are received, with respect to the internal time reference of the GSM phone 12, transmitted by the BTS 11 whose absolute geographical position is to be calculated. In this way it is possible to calculate the distances d1 and d2 corresponding to the variations in the radius between the circumferences constructed at the moments when the signal emitted by each BTS 11 arrives respectively in positions P1, P2 and P3. In order to determine the position of each BTS 11 a system of equations is constructed, where the unknown factors are the coordinates of the BTS 11 in the reference system considered, indicated by BTS (p,q), and the distance r of the point P1 from the BTS 11. Indicating by r1 and r2 the unknown radiuses of the circumferences of the wave fronts 30 respectively at points P2 and P3, the following equations may be written:

$$r_1 = r + d_1$$
$$r_2 = r + d_2 \quad (1)$$

Furthermore, considering the equation of the generic circumference of radius r and center in the position occupied by the BTS 11 of coordinates (p,q), we obtain the following equation:

$$r^2 = (x_1-p)^2 + (y_1-q)^2 \quad (2)$$

Furthermore, considering the equations of the circumferences of radius respectively r1 and r2 and center in the position occupied by the BTS 11 of coordinates (p, q) we can set the following system:

$$r^2 = (x_1-p)^2 + (y_1-q)^2$$
$$(r+d_1)^2 = (x_2-p)^2 + (y_2-q)^2$$
$$(r+d_2)^2 = (x_3-p)^2 + (y_3-q)^2 \quad (3)$$

Developing the system (3) operating by reciprocal subtraction, the quadratic terms cancel each other out and the system becomes linear. Since the terms x1, y1, x2, y2, x3, y3, d1 and d2 are known, it is possible to calculate the unknown factors r, p and q.

The resolution of the system (3) can be calculated according to an analytical method or a known numerical method.

For low performance GSM phones 12, a numerical method is used, most suitable to the calculation resources of the processing unit 16.

Given the limited minimum precision that is intrinsic in measuring distances and due to errors in measurement, it is preferable to consider several measurements in order to determine the position of the BTS 11.

Figure 6:
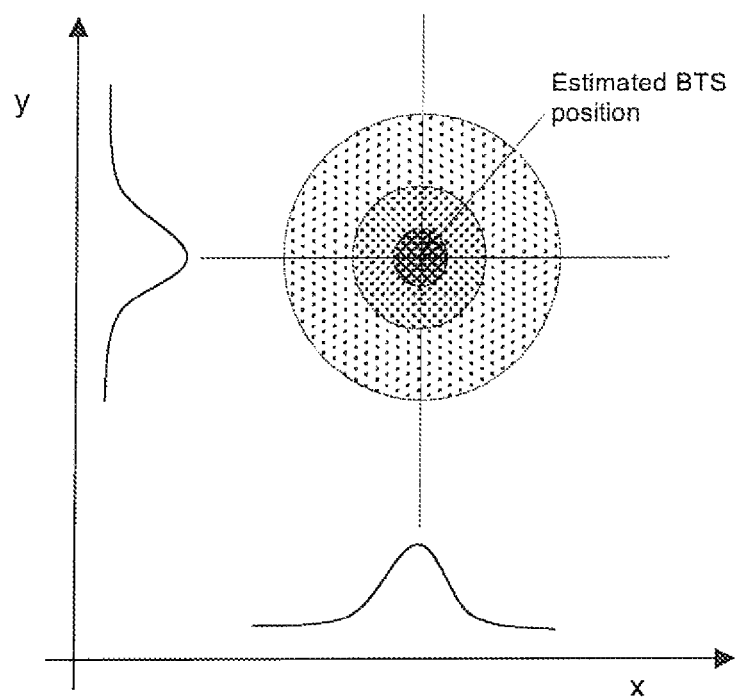
FIG. 6 is a schematic representation of the concept of estimated position of a base radio station in the variant in FIG. 7.

Therefore, according to a preferential embodiment, the position of a predetermined BTS 11 is determined by operating repeatedly on a sequence of detections and finally by calculating a function of probability in two dimensions that provides an estimated position of the BTS 11 in said reference system. A graphical representation of an example of this probability function in two dimensions is shown in FIG. 6.

Figure 7:
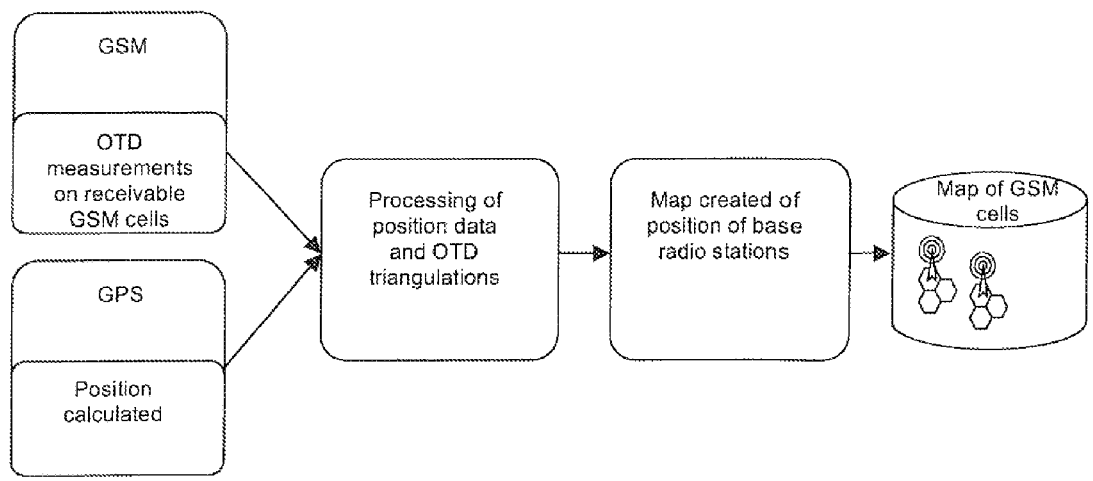
FIG. 7 is a flow chart showing the step in FIG. 7.

In a third step of the method the geographical positions of the BTS 11 are memorized (FIG. 7) in the memory 18, so as to generate a map of the BTS 11 visible by the phone 12.

During the normal functioning of the GSM phone 12, a list of adjacent BTS 11 is constantly updated, called BTS1, ... BTSn, with a chosen methodology based on the power received by the GSM phone 12 and/or on the fact that it belongs to a particular network operator.

With a predefined repetition cadence, the delays OTD are measured by estimating the delays in reception of the synchronization signals SB 38 of the channel SCH of the individual BTS 11 and simultaneously the detections of position with the position detector 20 are made, in order to update the position table of the adjacent stations BTS1, ..., BTSn.

The map of BTS 11 to be observed BTS1, ..., BTSn is kept updated over time and while the BTS 11 with a better signal received from the GSM phone 12 are included in the table, the weaker ones are discarded.

Advantageously the criterion of choice in discarding the particular BTS 11 from the map also depends on the particular geographical configuration of the area where the GSM phone 12 is to be found. It is the task of the processing unit 16 to select as significant the BTS 11 that ensure the best geometric configuration in order to minimize the errors in precision of the detections of geographical position.

Figure 8:
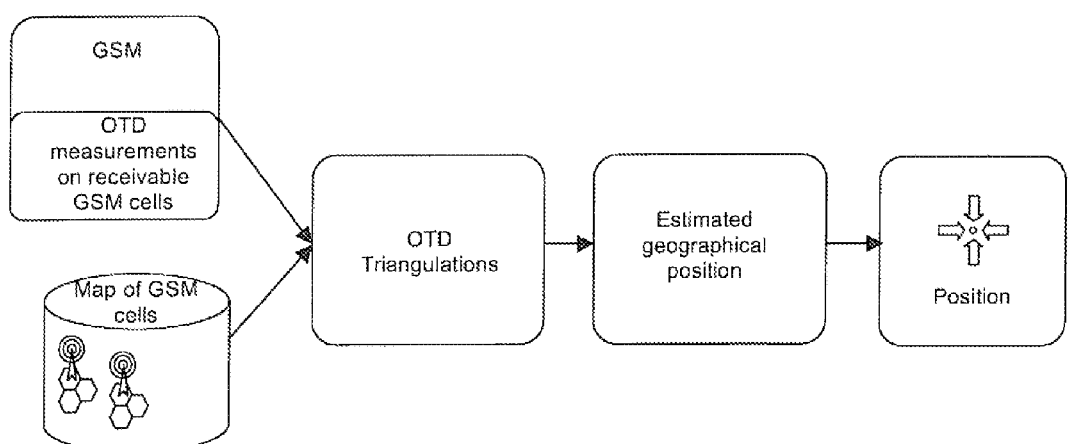
FIG. 8 is a flow chart showing steps after that shown in FIG. 9.
Figure 9:
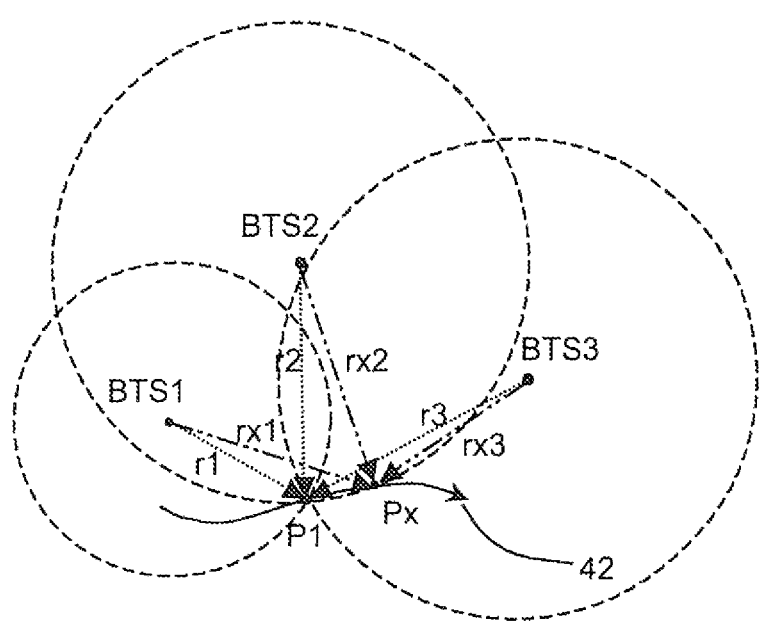
FIG. 9 is a schematic view of the steps in FIG. 8.

The method also comprises a fourth step in which, based on known geographical positions of the adjacent BTS 11, by detecting the delay times OBD with which the corresponding synchronization signals SB 38 of said BTS 11 are received and by comparing them with the values of delay times OBD detected in the previous positions of known coordinates, the coordinates of the current position occupied by the GSM phone 12 are calculated, as shown in FIGS. 8 and 9 and as will be explained in more detail hereafter.

The calculation of the coordinates of the position occupied by the GSM phone 12 is based on the measurement of the OBD and FND values with which the synchronization signals SB 38 of the corresponding BTS 11 are received.

By comparing the values of predetermined detections of the temporal delays at the points of known geographical position P1, ..., Pn with those made in the unknown position Px, the measurements of the distances of the position Px from the last known position Pn are calculated (FIG. 9). Subsequently, with a calculation analogous to that already described for calculating the position of the BTS 11, a system of equations is constructed which represent the circumferences of the wave fronts 30 having as radius the distances measured by the various BTS 11 BTS1, ..., BTSn, of which there must be three or more.

The resolution of the system supplies the coordinates of the unknown geographical position Px occupied by the GSM phone 12 as a point of intersection of the circumferences having a radius equal to the distances rx1, rx2, rx3 measured by the corresponding stations BTS1, BTS2 and BTS3.

To ensure perfect reception of the signal of the server BTS 11, the GSM phone 12 makes continuous corrections to its own time reference 32 in order to compensate the delays of the signal due to displacements with respect to the base. The corrections are called timing offset or Toff. Therefore, the delay values OBD measured for the adjacent BTS 11 are compensated to be on each occasion comparable with the time reference at the moment of observation. This is possible by adding or subtracting on each occasion the adequate time corrections in order to remain synchronized to the BTS 11 taken as reference.

The entity of the delays of the signal received for each adjacent cell BTS1, ..., BTSn therefore depends on the Toff corrections of the internal time reference 32, the OBD values measured and the FND delays, according to a random rule that depends on each occasion on the radio electric propagation conditions and the travel made by the mobile terminal.

Therefore, the real delay time Trit with which the synchronization signal SCH of an adjacent BTS 11 is detected by the GSM phone 12, is calculated again every time the internal time reference 32 of the GSM phone 12 is modified. As a result, by means of the processing unit 16, the detections measured are updated over time, compensating them for the absolute corrections to which the internal time reference 32 is subjected.

If the GSM phone 12 makes a reselection towards a new server BTS 11, or makes a handover during a telephone or data conversation, all the OTD detections made based on the time reference of the old server BTS 11 must be updated to the new time reference associated with the new server BTS 11.

It is clear that modifications and/or additions of parts and/or steps may be made to the method for the localization and mobility control of persons and things as described heretofore, without departing from the field and scope of the present invention.

It is also clear that, although the present invention has been described with reference to specific examples, a person of skill in the art shall certainly be able to achieve many other equivalent forms of method and device for the localization and mobility control of persons and things, having the characteristics as set forth in the claims and hence all coming within the field of protection defined thereby.

The invention claimed is:

1. A method for improving localization and mobility control of persons or things applicable to a mobile radio terminal associated with a telephone network, having a plurality of base radio stations, the method comprising the following steps:
    a first step in which the mobile radio terminal receives first service signals associated with each of the base radio stations within radio visibility;
    a second step in which, by a processing means, the mobile radio terminal detects relative temporal delays with which the first service signals of each of the base radio stations are respectively received at the mobile radio terminal, the temporal delays being calculated with respect to a predetermined time reference, and via a Global Navigation Satellite System (GNSS) associated with the mobile radio terminal, an absolute geographical position occupied by the mobile radio terminal is supplied to the mobile radio terminal,
    wherein in said second step, by said processing means, the mobile radio terminal calculates the absolute geographical position of each of said base radio stations, from which the mobile radio terminal has received the first service signals, according to said relative temporal delays, and
    wherein said relative temporal delays are correlated with the absolute geographical position of the mobile radio terminal as supplied by the Global Navigation Satellite System (GNSS);
    a third step in which, by means of memorization means of the mobile radio terminal, the absolute geographical positions of each of the base radio stations detected in said second step are memorized; and
    a fourth step in which the mobile radio terminal, by means of said processing means, calculates a new absolute geographical position both according to the absolute geographical position of each of said base radio stations, memorized by said memorization means, and also according to the relative temporal delays with which the service signals of each of the base radio stations are received by the mobile radio terminal with respect to the time reference of the mobile radio terminal, when the Global Navigation Satellite System (GNSS) is not available for the mobile radio terminal.

2. The method of claim 1, wherein said service signals comprise a carrier channel, the carrier channel being a Broadcast Control Channel (BCCH).

3. The method of claim 2, wherein said relative temporal delays are calculated according to a delay in reception of Synchronization Burst (SB) synchronization information, comprised in said Broadcast Control Channel (BCCH) received by each of the base radio stations with respect to a reference base radio station.

4. The method of claim 2, wherein said temporal delays are calculated according to a reception of information of a Timing Advance (TA), and received by one of the base radio stations, which is a serving base radio station.

5. The method of claim 1, wherein said time reference of the mobile radio terminal is an internal time reference including a hardware timer of desired precision and connected or included in said processing means.

6. The method of claim 1, wherein said time reference of the mobile radio terminal is the first service signal of a predetermined reference base radio station.

7. The method of claim 6, wherein said reference base radio station is one of the base radio stations serving the mobile radio terminal.

8. A device for localization and mobility control of persons or things, comprising:
    a mobile radio terminal associated with a reference base radio station of a telephone network, having a plurality of base radio stations, each emitting predetermined service signals;
    processing means for detecting relative temporal delays, with respect to a predetermined time reference, with which said mobile radio terminal receives the predetermined service signals from each of the base radio stations within radio visibility, said processing means being configured to compare the relative temporal delays associated with each of the adjacent base radio stations, and the relative temporal delays associated with the same adjacent base radio stations are detected in at least in a subsequent moment, in order to detect at least a difference in one of said relative temporal delays; and
    a global Navigation Satellite System (GNSS) for detecting an absolute geographical position occupied by the mobile radio terminal, said processing means calculating the absolute geographical position of a predetermined set of adjacent base radio stations, from which the mobile radio terminal receives a corresponding service signal, according to the absolute geographical position of the mobile radio terminal, as detected by the Global Navigation Satellite System (GNSS), and according to the relative temporal delays with which said predetermined service signals are received by the mobile radio terminal with respect to said time reference,
    wherein said processing means is configured to calculate a new absolute geographical position of the mobile radio terminal, according to the relative temporal delays, with respect to said time reference, with which the service signals of each of the adjacent base radio stations are received by the mobile radio terminal and according to the absolute geographical position of each of the predetermined set of the adjacent base radio stations, when the Global Navigation Satellite System (GNSS) is not available for the mobile radio terminal.

9. The method of claim 1, wherein, in said third step, the absolute geographical positions of significant ones of base radio stations are memorized and the absolute geographical positions of the remainder of the base radio stations are discarded, the significant ones of the base stations being selected by the processing means as those base stations that ensure the best geometric configuration in order to minimize the errors in precision of the detections of geographical position.

* * * * *

UNITED STATES PATENT AND TRADEMARK OFFICE
CERTIFICATE OF CORRECTION

| | | |
|---|---|---|
| PATENT NO. | : 9,110,151 B2 | Page 1 of 1 |
| APPLICATION NO. | : 12/819423 | |
| DATED | : August 18, 2015 | |
| INVENTOR(S) | : Demir Rakanovic et al. | |

It is certified that error appears in the above-identified patent and that said Letters Patent is hereby corrected as shown below:

In the Title Page, left column, item (73) Assignee:

"NEONSEVEN SPA" should read -- U-BLOX AG --

Signed and Sealed this
Twenty-ninth Day of December, 2015

Michelle K. Lee
*Director of the United States Patent and Trademark Office*